United States Patent
Valentine et al.

(10) Patent No.: US 11,494,174 B2
(45) Date of Patent: Nov. 8, 2022

(54) REMOTE SYSTEM UPDATE AND MONITORING WITHOUT INBOUND CONNECTION

(71) Applicant: International Business Machines Corporation, Armonk, NY (US)

(72) Inventors: Brian D Valentine, Endicott, NY (US); John Dale Eggleston, Vestal, NY (US); Brent J. Boisvert, Vestal, NY (US); Michael J Allen, Endicott, NY (US); Michael Lucks, Port Ewen, NY (US); Brendon Drew, Port Ewen, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/070,227

(22) Filed: Oct. 14, 2020

(65) Prior Publication Data

US 2022/0113954 A1    Apr. 14, 2022

(51) Int. Cl.
G06F 8/65 (2018.01)
H04L 9/40 (2022.01)
H04L 67/60 (2022.01)

(52) U.S. Cl.
CPC ............ *G06F 8/65* (2013.01); *H04L 63/0853* (2013.01); *H04L 67/60* (2022.05)

(58) Field of Classification Search
CPC ..... G06F 8/60; G06F 8/61; G06F 8/64; G06F 8/65; G06F 8/70; G06F 8/173
See application file for complete search history.

(56) References Cited

U.S. PATENT DOCUMENTS

| 7,630,381 B1 * | 12/2009 | Roskind | .............. H04L 51/20 370/395.42 |
| 9,411,864 B2 | 8/2016 | Glider et al. | |

(Continued)

FOREIGN PATENT DOCUMENTS

| CN | 107453925 A | 12/2017 |
| CN | 110795111 A | 2/2020 |

OTHER PUBLICATIONS

"A method to facilitate the execution of a multistep Remote AE process, by providing a single call interface.", An IP.com Prior Art Database Technical Disclosure, Disclosed Anonymously, IP.com No. IPCOM000223378D, IP.com Electronic Publication Date: Nov. 20, 2012, 7 pages.

(Continued)

*Primary Examiner* — Duy Khuong T Nguyen
(74) *Attorney, Agent, or Firm* — Edward J. Wixted, III

(57) ABSTRACT

In an approach, a processor receives input data comprising: (i) a code level for an update, (ii) a scheduled time for the update; (iii) a target system for the update, and (iv) authorization data, where the authorization data: (i) allows for scheduling of the update and (ii) is provided via a channel external from a connection to the target system without an inbound connection. A processor receives a set of data from the target system. A processor, responsive to receiving the set of data from the target system, sends a response packet to the target system that includes the input data. A processor receives, at the scheduled time, a request to process the update. A processor, responsive to the request, sends code for processing the update corresponding to the code level for the update. A processor receives status messages corresponding to progress of the update.

25 Claims, 5 Drawing Sheets

(56) References Cited

U.S. PATENT DOCUMENTS

| | | |
|---|---|---|
| 9,740,757 B1 | 8/2017 | Gilder et al. |
| 9,900,226 B2 | 2/2018 | Cornelius et al. |
| 2013/0067454 A1* | 3/2013 | Thompson .............. H04L 67/34 717/173 |
| 2016/0253471 A1 | 9/2016 | Volpe |
| 2016/0306619 A1 | 10/2016 | Yan |

OTHER PUBLICATIONS

"Configuring and Managing Remote Access for Industrial Control Systems", Centre for the Protection of National Infrastructure, Homeland Security, Nov. 2010, 66 pages.

"Method for agentless remote execution of Java applications", An IP.com Prior Art Database Technical Disclosure, Disclosed Anonymously, IP.com No. IPCOM000225219D, IP.com Electronic Publication Date: Jan. 31, 2013, 6 pages.

Dempsey et al. "Information Security Continuous Monitoring (ISCM) for Federal Information Systems and Organizations", National Institute of Standards and Technology, (NIST), U.S. Department of Commerce, NIST Special Publication 800-137, Sep. 2011, 80 pages.

\* cited by examiner

REMOTE SYSTEM UPDATE AND MONITORING WITHOUT INBOUND CONNECTION

BACKGROUND

The present invention relates generally to the field of system software/firmware updating, and more particularly to remote scheduling and monitoring of updates to an external system without initiating a connection to the external system.

Service representatives may maintain servers or other computing devices for client users. Typically, service representatives travel to a site to perform maintenance, update, repair, or other tasks associated with maintaining such computing devices. Some services, such as software or firmware updating, may be accomplished without a service representative physically traveling to the site.

A disadvantage of current solutions is that a service representative is required to establish a direct connection with a device to be serviced which can increase the risk of external security threats compromising the device to be serviced as such solutions require that the device to be serviced accept external direct connection requests.

SUMMARY

According to some embodiments of the present invention, a computer-implemented method, computer program product, and computer system are provided. A processor receives input data comprising: (i) a code level for an update, (ii) a scheduled time for the update; (iii) a target system for the update, and (iv) authorization data, where the authorization data: (i) allows for scheduling of the update and (ii) is provided via a channel external from a connection to the target system. A processor receives a set of data from the target system. A processor, responsive to receiving the set of data from the target system, sends a response packet to the target system that includes the input data. A processor receives, at the scheduled time, a request to process the update. A processor, responsive to the request, sends code for processing the update corresponding to the code level for the update. A processor receives status messages corresponding to progress of the update. Such an approach has the benefit of allowing a remote service update to a target system without requiring a remote device to initiate a connection with the target system and allows the remote device to monitor update progress without establishing a connection to the target system.

According to other embodiments of the present invention, a computer-implemented method, computer program product, and computer system are provided. A processor receives input data replicated from a first device, the input data comprising: (i) a code level for an update, (ii) a scheduled time for the update; (iii) a target system for the update, and (iv) authorization data, where the authorization data: (i) allows for scheduling of the update and (ii) is provided via a channel external from a connection to the target system. A processor receives a set of data from a second computing device in communication with the target system. A processor, responsive to receiving the set of data from the second computing device, sends a response packet to the second computing device that includes the input data. A processor receives, at the scheduled time, a request to process the update form the second computing device. A processor, responsive to the request, sends code for processing the update corresponding to the code level for the update to the second computing device. A processor receives status messages from the second computing device corresponding to progress of the update to the target system. Such an approach has the benefit of allowing a remote service update to a target system without requiring a remote device to initiate a connection with the target system and allows the remote device to monitor update progress without establishing a connection to the target system. Such an approach may enhance security and allow remote updates to a target system that does not accept external computing devices to initiate connection requests.

Embodiments of the present invention optionally include an approach where the status messages are appended to a remote support server request. Such an approach has the benefit of allowing a service representative to view status updates associated with the update to the target device by accessing the remote support server request and any information that has been appended to the remote support server request and, accordingly, monitor the update to the target system without maintaining a connection to the target system.

Embodiments of the present invention optionally include an approach where the set of data received from the target system is associated with a pre-scheduled periodic connection unrelated to the update. Such an approach has the benefit of creating a window within which a response packet to the target system can be sent that includes the input data such that the update to the target system can be scheduled without requiring a remote system to initiate a connection to the target system.

DETAILED DESCRIPTION

Embodiments of the present invention recognize that securely scheduling and monitoring a system code update process can increase the efficiencies of system updates that otherwise might have to be performed in person at a job site. Embodiments of the present invention recognize that secure systems exist that do not allow external parties (service representatives, external computing systems, etc.) to initiate calls into the secure system. Embodiments of the present invention provide an approach to remotely and securely schedule and monitor a system code update process without having to initiate a connection to schedule and/or monitor the target server.

The present invention will now be described in detail with reference to the Figures.

Figure 1:
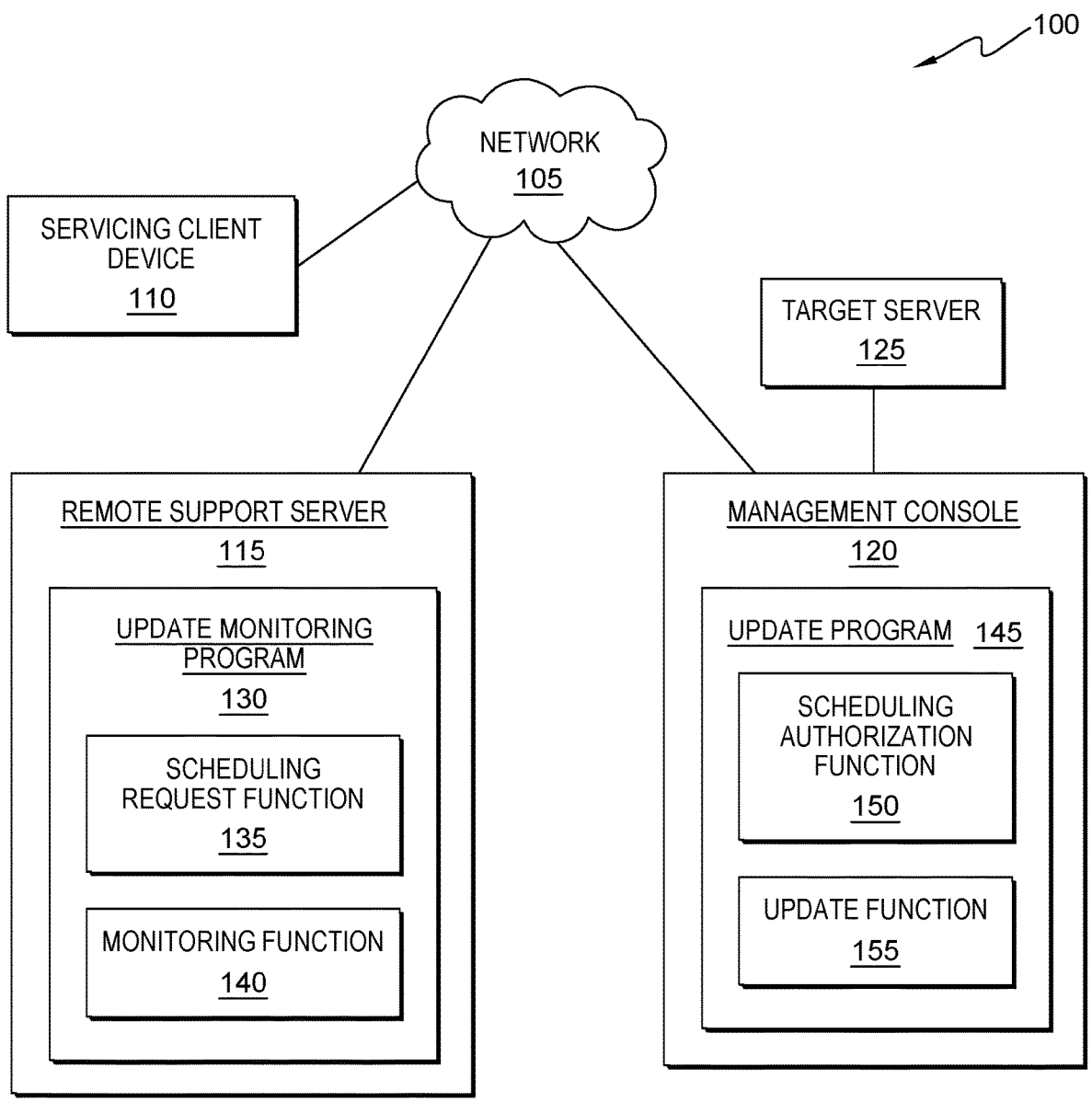
FIG. 1 depicts a diagram of a computing environment, in accordance with one embodiment of the present invention.

FIG. 1 depicts a diagram of a computing environment 100, in accordance with one embodiment of the present invention. FIG. 1 provides only an illustration of one embodiment and does not imply any limitations with regard to the environments in which different embodiments of the present invention can be implemented.

In the depicted embodiment, computing environment 100 includes servicing client device 110, remote support server 115, and management console 120 interconnected over network 105. Computing environment 100 also includes management console 120 and target server 125 interconnected over a direct connection or, in some embodiments, a second network (e.g., an internal or private network).

It shall be noted that, while FIG. 1 depicts target server 125 and management console 120 interconnected over a separate network, embodiments of the present invention anticipate embodiments in which management console 120 and target server 125 are a single device or where management console 120 is target server. Hereafter, reference is made to an embodiment that includes both management console 120 and target server 125. However, it is anticipated that the interactions between management console 120 and target server 125 may not occur in all embodiments and that update monitoring program 130 may communicate directly with target server 125 and that, in such embodiments, target server 125 may perform the processes associated with update program 145. Further, in describing the embodiment depicted by FIG. 1, a service representative is described as interacting with servicing client device 110. It shall be noted that embodiments of the present invention also anticipate an embodiment in which the service representative interacts directly with remote support server 115. All such embodiments described above are within the scope of embodiments of the present invention.

Network 105 can be a local area network (LAN), a wire area network (WAN) such as the Internet, the public switched telephone network (PSTN), any combination thereof, or any combination of connections and protocols that will support communications between servicing client device 110, remote support server 115, and management console 120, in accordance with embodiments of the invention. Network 105 can include wired, wireless, or fiber optic connections. Computing environment 100 can include additional computing devices, servers, computers, mobile devices, or other devices not shown.

Remote support server 115 can be a management server, a web server, or any other electronic device or computing system capable of receiving and sending data. In some embodiments, remote support server 115 can be a laptop computer, tablet computer, netbook computer, personal computer (PC), a desktop computer, or any programmable electronic device capable of communicating with servicing client device 110 and management console 120 via network 105. In other embodiments, remote support server 115 can represent a server computing system utilizing multiple computers as a server system, such as in a cloud computing environment. In another embodiment, remote support server 115 represents a computing system utilizing clustered computers and components to act as a single pool of seamless resources. Remote support server 115 contains update monitoring program 130. Remote support server 115 can include components, as depicted and described in further detail with respect to FIG. 6.

Update monitoring program 130 operates to schedule software or firmware updates for a target device, such as target server 125 and, subsequently, receive progress status updates from the target device during the scheduled updates. In some embodiments, update monitoring program 130 schedules updates and monitors update progress directly with target server 125. In other embodiments, management console 120 an intermediary between remote support server 115 and target server 125 and target server 125 does not directly communicate with remote support server 115. In one embodiment, update monitoring program 130 resides on remote support server 115. In other embodiments, update monitoring program 130 can reside on another server or another computing device, provided that update monitoring program 130 is able to communicate with management console 120 and/or target server 125. In one embodiment, update monitoring program 130 includes two functions: scheduling request function 135 and monitoring function 140.

Scheduling request function 135 operates to receive system update details (e.g., scheduling date/time, authorization code/token, target server, version/code level) input by a service representative or administrative user, such as a service representative interacting with servicing client device 110, and return the system update details to a management console, such as management console 120, that is in communication with the target server (e.g., target server 125). Scheduling request function 135 sends such system update details via a response packet after receiving data (e.g., periodically sent system availability data) from management console 120. Scheduling request function 135 may further receive an acknowledgment from management console 120 that the system update has been scheduled, and scheduling request function 135 may store the acknowledgement to persistent storage of remote support server 115 or send the acknowledgment to servicing client device 110 for access by the service representative. In one embodiment, scheduling request function 135 is a function of update monitoring program 130. In another embodiment, scheduling request function 135 is a standalone program executing on remote support server 115 or another server or computing device, provided that scheduling request function 135 is able to communicate with servicing client device 110, management console 120, and/or target server 125.

As the system update occurs, monitoring function 140 operates to receive update status messages from target server 125 either directly or from management console 120. Such status messages may be monitored by a service representative operating servicing client device 110 or remote support server 115. In one embodiment, monitoring function is a function of update monitoring program 130. In another embodiment, monitoring function is a standalone program executing on remote support server 115 or another server or computing device, provided that monitoring function 140 is able to communicate with servicing client device 110, management console 120, and/or target server 125.

Servicing client device 110 can be a laptop computer, a netbook computer, a tablet computer, a PC, a desktop computer, a personal digital assistant (PDA), or a smartphone. In general, servicing client device 110 may be any electronic device or computing system capable of executing computer code and communicating with remote support server 115. In general, servicing client device 110 is utilized by a service representative or other administrative user to input system update details to be replicated to remote support server 115 for use by update monitoring program 130 and scheduling request function 135. Servicing client device 110 may also be used by such a user to monitor status updates relating to a scheduled update of target server 125. Servicing client device 110 can include components, as depicted and described in further detail with respect to FIG. 6.

Management console 120 can be a management server, a web server, or any other electronic device or computing system capable of receiving and sending data. In some embodiments, management console 120 can be a laptop computer, tablet computer, netbook computer, PC, a desktop computer, or any programmable electronic device capable of communicating with remote support server 115 via network 105 and target server 125 via another network or direct connection. In other embodiments, management console 120 can represent a server computing system utilizing multiple computers as a server system, such as in a cloud computing environment. In another embodiment, management console 120 represents a computing system utilizing clustered computers and components to act as a single pool of seamless resources. Management console 120 contains update program 145. In some embodiments, management console 120 generally operates to manage target server 125, allowing a system administrator to manage, monitor, and service target server 125, which may not be accessible to remote users via network 105. Management console 120 can include components, as depicted and described in further detail with respect to FIG. 6.

Target server 125 can be a management server, a web server, or any other electronic device or computing system capable of receiving and sending data. In some embodiments, target server 125 can be a laptop computer, tablet computer, netbook computer, PC, a desktop computer, or any programmable electronic device capable of communicating with management console 120. In other embodiments, target server 125 can represent a server computing system utilizing multiple computers as a server system, such as in a cloud computing environment. In another embodiment, target server 125 represents a computing system utilizing clustered computers and components to act as a single pool of seamless resources. In general, target server 125 is any server, mainframe, or computing device that is to be scheduled for a firmware and/or software update to the system. In one embodiment, target server 125 does not allow external services to initiate calls into target server 125. Target server 125 can include components, as depicted and described in further detail with respect to FIG. 6.

Update program 145 operates to identify that an authorized attempt to schedule a system update has been received, schedule and send acknowledgment of the scheduling of the system update, and, subsequently, pull or otherwise receive the required system update data (e.g., installation files, firmware updates, code), from remote support server 115 to target server 125, either directly or through management console 120 in response to a code load request at the scheduled date and time corresponding to the system update details. Update program 145 also generates update status messages to be sent to remote server 115 for access by a service representative or other administrative user at servicing client device 110 or remote support server 115. In one embodiment, update program 145 resides on management console 120. In other embodiments, update program 145 can reside on another server or another computing device, such as target server 125, provided that update program 145 is able to communicate with target server 125 and remote support server 115. In one embodiment, update program 145 includes two functions: scheduling authorization function 150 and update function 155.

Scheduling authorization function 150 operates to schedule and send acknowledgement of requests to schedule system updates. Such system update requests are received by scheduling authorization function 150 as metadata of a return packet in response to data packet(s) (e.g., system availability data) that may be periodically (e.g., hourly, daily, weekly) sent by management console 120 for target server 125. The metadata received by scheduling authorization function 150 may include information such as scheduling data (e.g., date, time), an authorization code/token, a target device, such as target server 125, and a specified code level or software/firmware version associated with the system update. In one embodiment, scheduling authorization function 150 is a function of update program 145. In another embodiment, scheduling authorization function 150 is a standalone program executing on management console 120, target server 125, or another server or computing device, provided that scheduling authorization function 150 is able to communicate with management target server 125 and/or remote support server 115.

Update function 155 operates to, at the scheduled date and time for the system update, generate and send a remote code load request to remote server 115, pull or otherwise receive system update data (e.g., installation files, firmware updates, code) for processing by target server 125 to perform the update, and sent system update status messages periodically throughout the update to remote support server 115 for access by a service representative or administrative user via servicing client device 110 or remote support server 115. In one embodiment, update function 155 is a function of update program 145. In another embodiment, update function 155 is a standalone program executing on management console 120, target server 125, or another server or computing device, provided that update function 155 is able to communicate with management target server 125 and/or remote support server 115.

Figure 2:
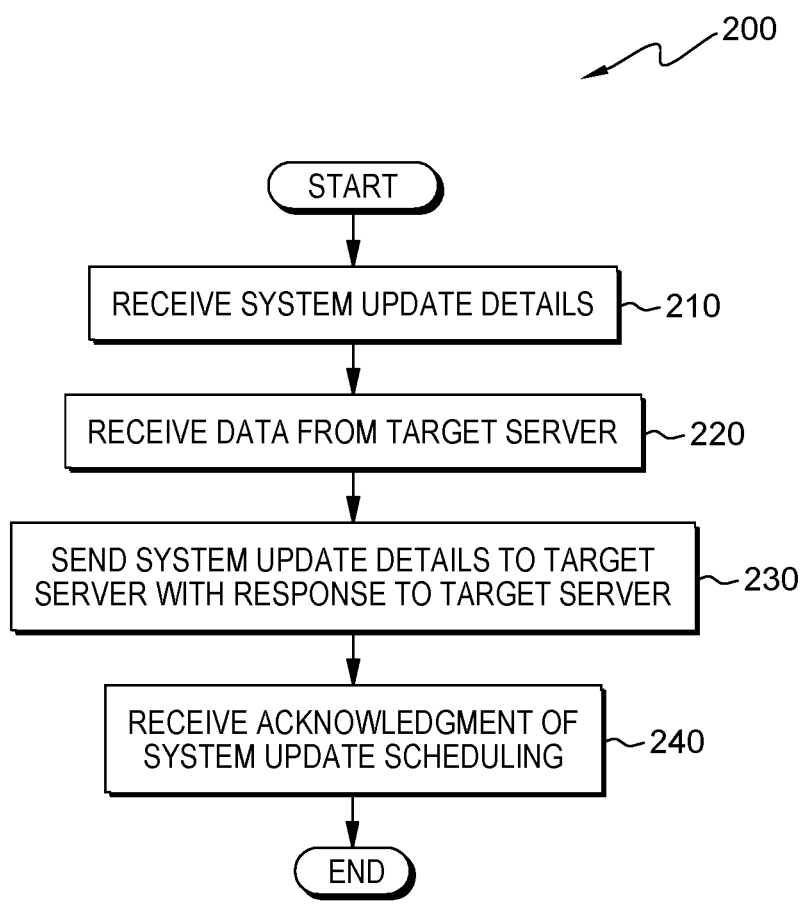
FIG. 2 depicts a flowchart of the steps of a scheduling request function of an update monitoring program executing within the computing environment of FIG. 1, for sending a system update schedule request and receiving authorization of such a request, in accordance with one embodiment of the present invention.

FIG. 2 depicts a flowchart 200 of the steps of scheduling request function 135 executing within computing environment 100 of FIG. 1, for sending a system update schedule request and receiving authorization of such a request, in accordance with one embodiment of the present invention.

In one embodiment, initially, a service representative of other administrative user coordinates with a second user associated with target server 125. For example, the second user may be a client or customer of the service representative who owns/leases target server 125 and the service representative may be responsible for maintaining and/or updating target server 125. The service representative obtains an authorization token or code via a channel external to network 105. For example, the second user may verbally provide the service representative with such an authorization token via a telephone call or in-person exchange. In some embodiments, the authorization token is a one-time limited availability authorization token that allows for scheduling. An administrative user at target server 125 or management console 120 may request such an authorization token to be provided to the service representative, and, in response to the request, an authorization token may be generated. The authorization token may be, for example, a 6-digit hash token that may be read and passed on verbally to the service representative. In addition, the second user may provide the service representative with other information related to the system update such as scheduling information (date/time), the specific system (e.g., target server 125) to be updated, desired code level or software/firmware version, or other information relevant to scheduling a system update.

Subsequent to receiving the system update details, the service representative enters the system update details at a computing device. In some embodiments, the service representative enters the system update details at servicing client device 110. In other embodiments, the service representative enters the system update details at remote support server 115.

In step 210, scheduling request function 135 receives the system update details. In embodiments where the system update details are entered directly at remote support server 115, scheduling request function 135 receives the system update details via user (e.g., service representative) input at a user interface of remote support server 115. In embodiments where the system update details are entered at servicing client device 110, scheduling request function 135 receives the system update details from servicing client device 110. For example, a process of servicing client device 110 may copy, send, or otherwise replicate the system update details to remote support server 115 over network 105 such that the system update details are accessible by scheduling request function 135.

In step 220, scheduling request function 135 receives data from target server 125. In some embodiments, scheduling request function 135 receives data directly from target server 125. In other embodiments, scheduling request function 135 receives data from management console 120 that substantively references target server 125. The data received by scheduling request function 135 may be in the form of periodic and regularly scheduled system availability data or other types of scheduled data. In general, the data received from target server 125 is unrelated to the system update details received by scheduling request function 135 (see step 210). Scheduling request function 135 may receive such data periodically, for example, daily. In other embodiments, scheduling request function 135 receives such data periodically, but not according to any particular schedule. For example, target server 125 or management console 120 may send such data based on a particular metric being met or threshold being exceeded.

In step 230, scheduling request function 135 sends system update details to target server 125 with the response to target server 125. In some embodiments, scheduling request function 135 sends the system update details directly to target server 125. In other embodiments, scheduling request function 135 sends the system update details to management console 120, management console 120 being in communication with target server 125. In general, scheduling request function 135 sends the system update details as metadata in a response data packet that is sent to target server 125 and/or management console 120 in response to receiving the data (see step 220) from target server 125 and/or management console 120. As described above, the system update details included in the metadata of the response data packet may include such details as update date/time, authorization token/code, code level or software/firmware version number, and a specification of the target server. A specification of the target server may aid in both authorization and, for example, if management console 120 is operatively connected to multiple potential target servers in addition to just target server 125. As a result of scheduling request function 135 sending the system update details via a response data packet, scheduling request function 135 does not need to initiate a call or connection into target server 125 or management console 120, but is still able to provide the system update details to target server 125 and/or management console 120.

In step 240, scheduling request function 135 receives acknowledgment from target server 125. In some embodiments, scheduling request function 135 receives the acknowledgment directly from target server 125. In other embodiments, scheduling request function 135 receives the acknowledgment from management console 120. The acknowledgment may provide a confirmation that the system update details were received by management console 120 and/or target server 125 and that the system update is scheduled for the specified date/time.

Figure 3:
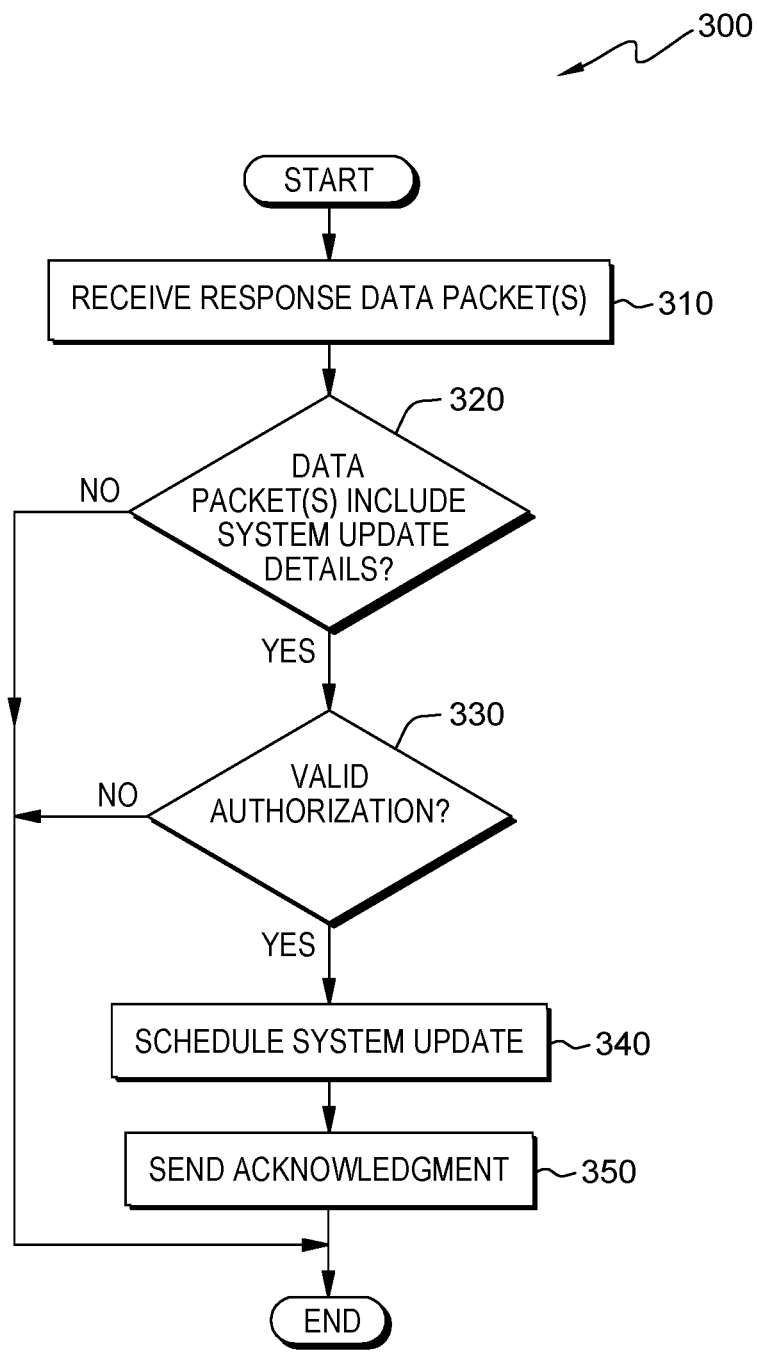
FIG. 3 depicts a flowchart of the steps of a scheduling authorization function of an update program executing within the computing environment of FIG. 1, for authorizing and scheduling a system update based on a request received from a scheduling request function in a return data packet, in accordance with one embodiment of the present invention.

FIG. 3 depicts a flowchart 300 of the steps of scheduling authorization function 150 executing within computing environment 100 of FIG. 1, for authorizing and scheduling a system update based on a request received from scheduling request function 135 in a return data packet, in accordance with one embodiment of the present invention.

As described herein, scheduling authorization function 150 resides on management console 120 and is managing target server 125. Some embodiments of the present invention may include a scheduling authorization function that resides on target server 125 and no management console may be present in such embodiments.

In one embodiment, initially, management console 120 sends periodic updates to remote support server, as described in reference to FIG. 2 (See step 220). A process of management console 120 may send such updates based on time period (e.g., hourly, daily, weekly), or other metrics (e.g., in response to system crash/error/reboot, if workloads exceed a preselected threshold). In one embodiment, a process of management console 120 monitors target server 125 to determine when to send such updates, and what information such updates shall contain. In other embodiments, a process of target server 125 sends status updates to management console 120, and a process of management console 120 relays the received information to remote support server 115. The updates may include a variety of information such as, but not limited to, system availability data, status data, system error data, or any other type of data.

In step 310, scheduling authorization function 150 receives one or more response data packets as a return from a sent update of the previously described periodic updates. Scheduling authorization function 150 receives the one or more response data packets from remote support server 115.

In decision 320, scheduling authorization function 150 determines whether the one or more received response data packets include system update details. In some embodiments, scheduling authorization function 150 may receive a variety of response data packets. For example, remote support server 115 may merely send a response data packet acknowledging receipt of data packets sent by various processes of target server 125 and/or management console 120. Scheduling authorization function 150 analyzes the received data packet(s) and identifies whether system update metadata, as previously described, is included in any of the received data packet(s).

If scheduling authorization function 150 determines that there are not system update details in the one or more received response data packets (decision 320, no branch), the function is complete.

If scheduling authorization function 150 determines that there are system update details in the one or more received response data packets (decision 320, yes branch), scheduling authorization function 150 determines whether the system update details include valid authorization (decision 330). Scheduling authorization function 150 may determine whether the system update details include valid authorization by comparing any received authorization information (e.g., authorization token) to authorization information associated with target server 125 and/or management console 120. As described above in reference to FIG. 2, an administrative user at either target server 125 or management console 120 may have caused a process of target server 125 or management console 120 to generate authorization in the form of, for example, an authorization token. Such authorization information is stored to target server 125 and/or management console 120 such that management console 120 has access to the authorization information. Accordingly, when scheduling authorization function 150 receives a response data packet that includes system update details, scheduling authorization function 150 compares the authorization from the received data packet to the stored authorization information generated at either target server 125 or management console 120. In some embodiments, the authorization information is also associated with other system update details, such as scheduling information (e.g., date/time), target server information, and/or code level or software/firmware version number. By associating the authorization information with these further system update details, security is enhanced as, in addition to the authorization information, a user generating the system update details may be required to know additional information about the system update.

If scheduling authorization function 150 determines that there is not valid authorization (decision 330, no branch), the function is complete. In some embodiments, subsequent to determining that there is not valid authorization, scheduling authorization function 150 may send an alert or other notification to remote support server 115 indicating that the system update will not be scheduled. Such an alert or notification may be accessible to a service representative or other administrative user at servicing client device 110 or remote support server 115. In some embodiments, the alert or other notification may provide information indicating why the authorization as deemed invalid (e.g., incorrect authorization token, authorization token did not match other system update details).

If scheduling authorization function 150 determines that there is valid authorization (decision 330, yes branch), scheduling authorization function 150 schedules the system update (step 340). In general, authorization function 150 schedules the system update for the date and time indicated by the system update details. Scheduling authorization function 150 may store additional system update details. In some embodiments, processes of management console 120 manage updates for target server 125 and therefore, scheduling authorization function 150 stores any necessary information to management console 120. In other embodiments, target server 125 may communicate directly with remote support server 115 and, in such embodiments, scheduling authorization function 150 may store system update details to target server 125 and schedule the system update on target server 125.

In step 350, scheduling authorization function 150 sends acknowledgment to remote support server 115. Scheduling authorization function 150 may send acknowledgment detailing that the system update details have been received and the system update is scheduled to be performed at the date and time indicated in the response data packet.

In some embodiments, a user at target server 125 or management console 120 may be able to view or cancel all code load or other system updates to target server 125 prior to the start of the scheduled code load or software/firmware installation process.

Figure 4:
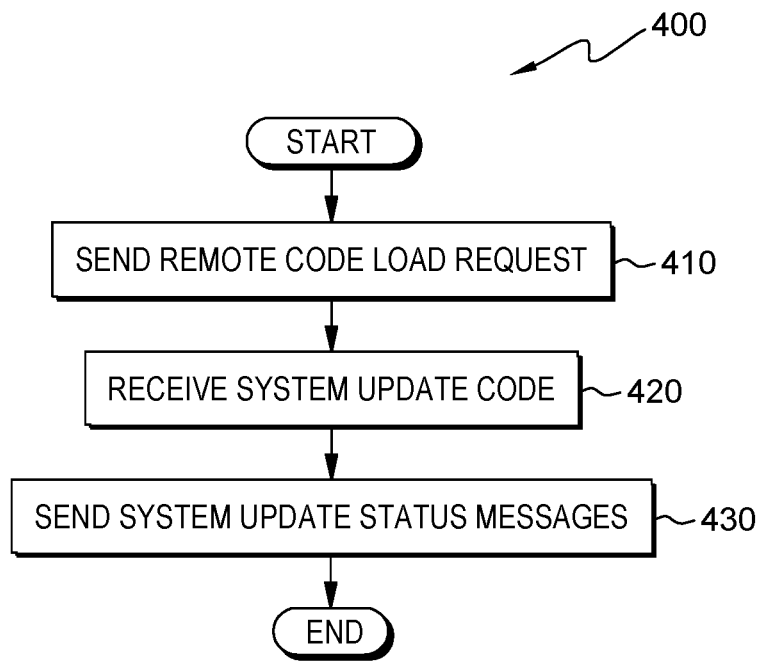
FIG. 4 depicts a flowchart of the steps of an update function of an update program executing within the computing environment of FIG. 1, for, at a scheduled date and time, initiating a code load or software/firmware update request of a target server and sending update status messages periodically throughout the update, in accordance with one embodiment of the present invention.

FIG. 4 depicts a flowchart 400 of the steps of update function 155 executing within the computing environment 100 of FIG. 1, for, at the scheduled date and time, initiating the code load or software/firmware update request of target server 125 and sending update status messages periodically throughout the update.

As described herein, update function 155 resides on management console 120 and is managing target server 125. Some embodiments of the present invention may include an update function that resides on target server 125 and no management console may be present in such embodiments.

In one embodiment, initially, scheduling authorization function 150 has received system update details and scheduled the system update for target server 125.

In step 410, update function 155 sends a remote code load or software/firmware update request to remote support server 115. In some embodiments, update function 155 opens a type of remote support server request outbound connection to indicate remote code load or software/firmware update. In general, a remote support server request sends detailed information to remote support server 115. For example, some remote support server request types send detailed error information that can be used by a service representative to prepare an action plan. In some embodiments of the present invention, the remote load remote support server request opens a new remote support server request. In general, update function 155 sends a remote code load or software/firmware request that may specify the system update details, such as, for example, software/firmware version number or code level.

In step 420, update function 155 receives the system update code associated with the system update. For example, update function 155 may receive installation files, software/firmware code, or any other code used to process the system update for target server 125. In some embodiments, update function 155 may pull the required system update data (e.g., installation files, firmware updates, code), from remote support server 115. In embodiments that include management console 120, update function 155 may send such received system update code to target server 125 to install or otherwise process the system update. In embodiments that do not include management console 120, update function 155 may be executing on target server 125 and target server 125 may be able to directly process the received system update code. In some embodiments, update function 155 may receive all of the system update code required to perform the system update of target server 125 prior to initializing the installation or processing of such code for the update. In other embodiments, the installation or processing of the system update of target server 125 may occur in parallel with receiving system update code (e.g., for a software update, multiple installation files may exist). In some embodiments, management console 120 actively manages the system update of target server 125.

In step 430, update function 155 sends system update status messages to remote support server 115. In general, update function 155 sends periodic system update status messages to remote support server 115 that include details associated with the system update of target server 125. In some embodiments, update function 155 appends the system update messages to the remote support server request such that the system updates are associated with the problem opened for the code load on remote support server 115, allowing such system updates to be accessible by a service representative or other user at servicing client device 110 or remote support server 115. In some embodiments, target server 125 directly sends system update status messages to remote support server 115. In other embodiments, target server 125 sends system update status messages to management console 120 and update function 155 sends the system update status messages to remote support server 115. In still other embodiments, management console 120 actively manages the system update of target server 125, and, accordingly, is able to monitor the system update of target server 125 and generate system update status messages. The system update status messages sent by update function 155 may include detailed code load in process messages, shutdown/reboot information, as well as any errors during the code load or a designation of code load or installation failure, including any details that caused the failure. In some embodiments, update function 155 periodically sends such system update messages according to a predefined period of time, for example, once every three minutes. In other embodiments, update function 155 periodically sends such system updates based on another metric associated with the system update process. Such metrics may be based on, for example, percent completion (e.g., one system update message for every percentage point complete in the installation of a software/firmware update) or presence of an error message.

Figure 5:
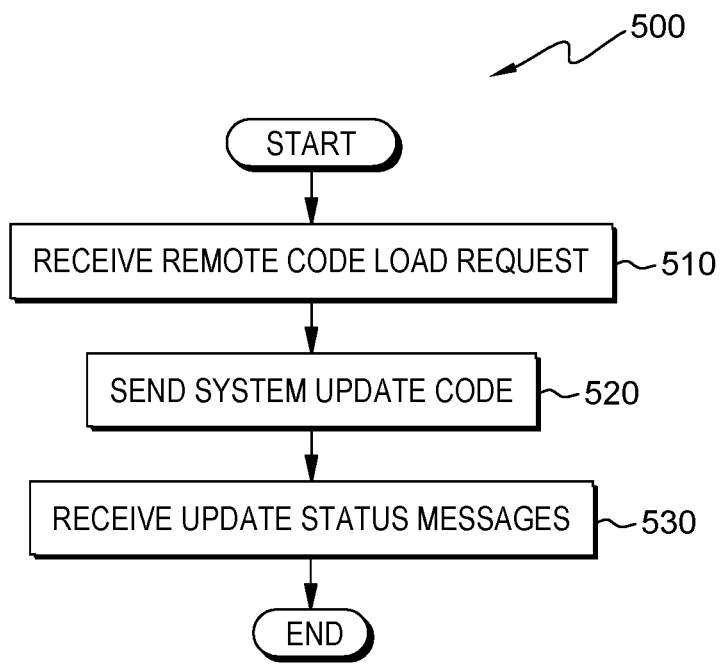
FIG. 5 depicts a flowchart of the steps of a monitoring function of an update monitoring program executing within the computing environment of FIG. 1, for sending system update code and receiving update status messages, allowing for a user to monitor the system update of a target server are a remote location, without initiating or establishing an external connection, in accordance with one embodiment of the present invention.

FIG. 5 depicts a flowchart 500 of the steps of monitoring function 140 executing within computing environment 100 of FIG. 1, for sending system update code and receiving update status messages, allowing for a service representative or other authorized user to monitor the system update of target server 125 at remote support server 115 or servicing client device 110, without initiating or establishing an external connection to management console 120 or target server 125.

In one embodiment, initially, scheduling request function 135 coordinates with scheduling authorization function 150 to schedule and confirm scheduling of a code load or software/firmware update to target server 125 based on information received from a service representative or other administrative user at servicing client device 110 or remote support server 115.

In step 510 monitoring function 140 receives a remote code load request for a code load or software/firmware update to target server 125. In some embodiments, monitoring function 140 receives the remote code load request from management console 120. In other embodiments, monitoring function 140 receives the remote code load request from target server 125. In general, monitoring function 140 receives the remote code load request from the device operably performing steps associated with update function 155. In some embodiments, the remote code load request is in the form of a remote support server request, as described in reference to update function 155 at step 410 of FIG. 4. The code load request may specify details associated with the system update such as target system (e.g., target server 125), code level or software/firmware version for the update, or other information.

In step 520, monitoring function 140 sends the system update code for target server 125 to management console 120 or, in embodiments where there is no management console 120, target server 125. In general, monitoring function 140 sends the system update code in response to the received remote code load request, and monitoring function 140 does not initiate sending of system update code to management console 120. In some embodiments, update function 155 may pull the system update code from remote support server 115 and monitoring function 140 may not send the system update code. System update code may include, for example, software/firmware code, installation files, or any other code used to process the system update for target server 125.

In step 530 monitoring function 140 receives update status messages associated with the system update of target server 125 from management console 120 or, in embodiments where management console 120 is not present, target server 125. The update status messages that monitoring function 140 receives are the update status messages described in reference to update function 155 (see step 430, FIG. 4). Such update status messages may include installation errors, update statuses, code load progress messages, or any other status messages associated with the system update of target server 125. Monitoring function 140 may receive such update status messages periodically, as described in reference to update function 155. In some embodiments, the update status messages are appended to the original problem opened for the code load via the remote code load request (see step 510). In general, monitoring function 140 stores the update status messages such that they are accessible by a service representative or other administrative user at servicing client device 110 or remote support server 115. In some embodiments, monitoring function 140 sends the update status messages to servicing client device 110.

By storing the update status messages and making the update status messages accessible to the service representative or other administrative user at servicing client device 110 or remote support server 115, monitoring function 140 allows a service representative or other administrative user to monitor the update associated with target server 125 remotely from the site location of management console 120 and/or target server 125 without requiring such a user to utilize a remote device (e.g., servicing client device 110, remote support server 115) to establish an external connection with target server 125 or management console 120. While remote support server 115 may respond to target server 125 or management console 120, remote support server 115 does not initiate external calls and, instead, responds to data requests that originated from target server 125 or management console 120. Servicing client device 110 never directly communicates with management console 120 or target server 125 and, embodiments of the present invention, allow a service representative or other user to monitor update status of target server 125 by monitoring the update status messages sent to remote support server 115. If an error occurs that causes the system update of target server 125 to fail, the system representative may be able to visit the site of management console 120 and/or target server 125 to perform any necessary on-site service tasks, and an action plan may be developed while the service representative is en route to the site. Embodiments of the present invention recognize the advantages in not requiring a service representative to travel to a site in instances where such a remote code load, as described herein, is successfully performed and the system successfully updated. Further, the remote code load described herein allows target server 125 and/or management console 120 to initiate the code load and neither servicing client device 110, nor remote support server 115 initiate any connections to target server 125 or management console 120, thus enhancing the security of target server 125 and/or management console 120 from potential external security threats.

Figure 6:
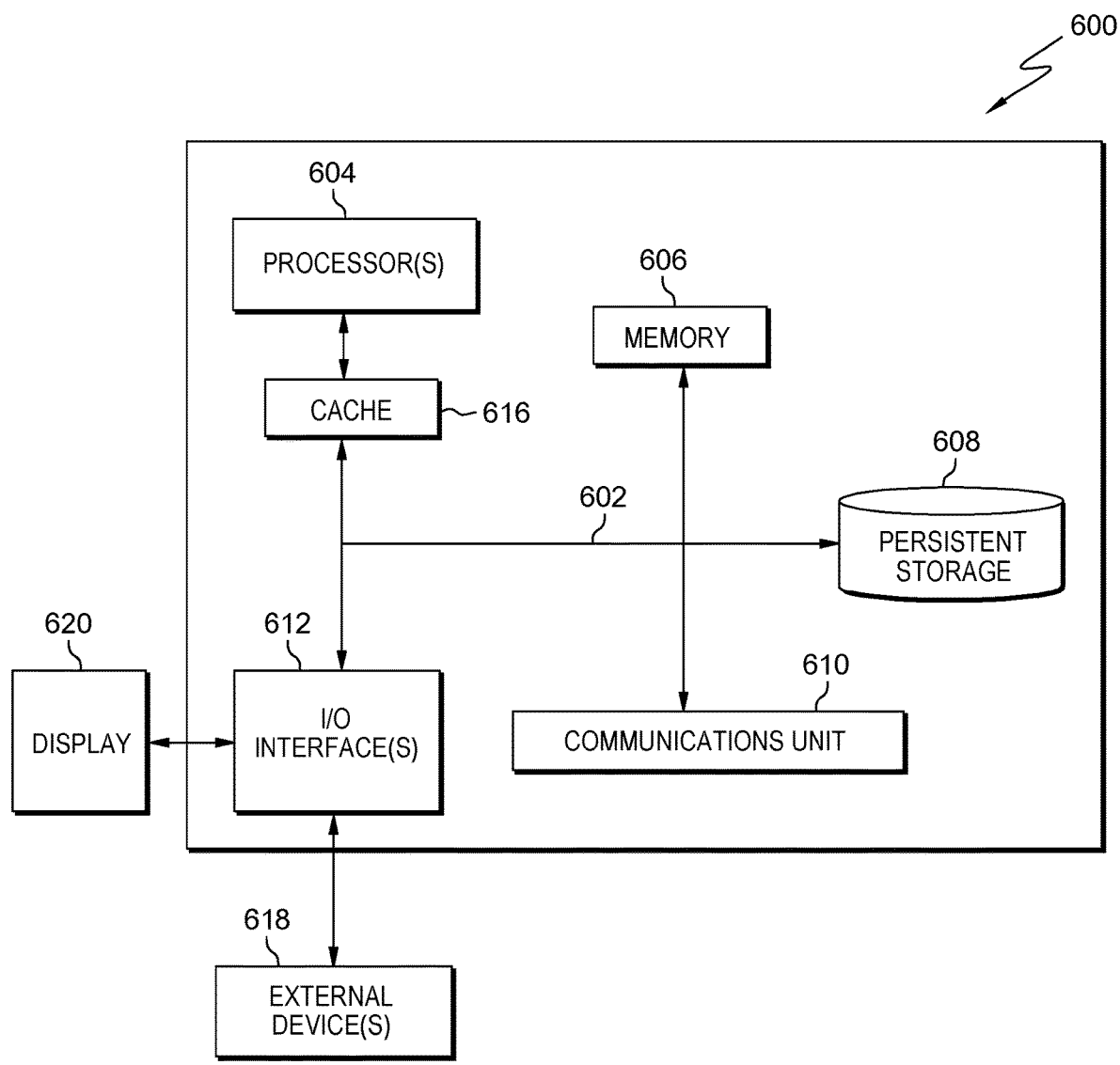
FIG. 6 depicts a block diagram of components of the servicing client device, remote support server, management console, and target server, in accordance with one embodiment of the present invention.

FIG. 6 depicts a block diagram 600 of components of servicing client device 110, remote support server 115, management console 120, and/or target server 125 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Each of servicing client device 110, remote support server 115, management console 120, and target server 125 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Update monitoring program 130, scheduling request function 135, and monitoring function 140 may be stored in persistent storage 608 of remote support server 115 and in memory 606 of remote support server 115 for execution by one or more of the respective computer processors 604 via cache 616. Update program 145, scheduling authorization function 150, and update function 155 may be stored in persistent storage 608 of management console 120 and in memory 606 of management console 120 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Update monitoring program 130, scheduling request function 135, and monitoring function 140 may be downloaded to persistent storage 608 of remote support server 115 through communications unit 610. Update program 145, scheduling authorization function 150, and update function 155 may be downloaded to persistent storage 608 of management console 120 through communications unit 610.

I/O interface(s) 612 allows for input and output of data with other devices that may be connected to servicing client device 110, remote support server 115, management console 120, and/or target server 125. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., update monitoring program 130, scheduling request function 135, and monitoring function 140, can be stored on such portable computer readable storage media and can be loaded onto persistent storage 608 of remote support server 115 via I/O interface(s) 612. Additional software and data used to practice embodiments of the present invention, e.g., update program 145, scheduling authorization function 150, and update function 155, can be stored on such portable computer readable storage media and can be loaded onto persistent storage 608 of management console 120 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, input data comprising: (i) a code level for an update, (ii) a target system for the update (iii) a scheduled time for the update of the target system, and (iv) authorization data, wherein:
   the target system does not allow external services to initiate calls into the target system; and
   the authorization data: (i) allows for scheduling of the update to the target system and (ii) is provided via a channel external from a connection to the target system;
   receiving, by one or more processors, a set of data from the target system;
   responsive to receiving the set of data from the target system, sending, by one or more processors, a response packet to the target system that includes the input data;

receiving, at the scheduled time for the update of the target system, by one or more processors, a request to process the update;

responsive to the request, sending, by one or more processors, code for processing the update corresponding to the code level for the update; and receiving, by one or more processors, status messages corresponding to progress of the update.

2. The computer-implemented method of claim 1, wherein the request to process the update comprises a remote support server request generated by the target system.

3. The computer-implemented method of claim 2, wherein the status messages are appended to the remote support server request.

4. The computer-implemented method of claim 1, further comprising:

subsequent to sending the response packet to the target system that includes the input data, receiving, by one or more processors, confirmation from the target system that the update is scheduled for the scheduled time for the update.

5. The computer-implemented method of claim 1, wherein the status messages are received according to a predetermined time interval throughout the update.

6. The computer-implemented method of claim 1, wherein the set of data received from the target system is associated with a pre-scheduled periodic connection unrelated to the update.

7. The computer-implemented method of claim 1, wherein the status messages include information selected from the group consisting of: a reboot by the target system and an error.

8. The computer-implemented method of claim 1, wherein the authorization data comprises an authorization token generated by the target system.

9. A computer-implemented method comprising:

receiving, by one or more processors, input data replicated from a first device, the input data comprising: (i) a code level for an update, (ii) a target system for the update, (iii) a scheduled time for the update of the target system, and (iv) authorization data, wherein:

the target system does not allow external services to initiate calls into the target system; and the authorization data: (i) allows for scheduling of the update to the target system and (ii) is provided via a channel external from a connection to the target system;

receiving, by one or more processors, a set of data from a second computing device in communication with the target system;

responsive to receiving the set of data from the second computing device, sending, by one or more processors, a response packet to the second computing device that includes the input data;

receiving, at the scheduled time for the update of the target system, by one or more processors, a request to process the update from the second computing device;

responsive to the request, sending, by one or more processors, code for processing the update corresponding to the code level for the update to the second computing device; and receiving, by one or more processors, status messages from the second computing device corresponding to progress of the update to the target system.

10. The computer-implemented method of claim 9, wherein the request to process the update comprises a remote support server request generated by the second computing device.

11. The computer-implemented method of claim 10, wherein the status messages are appended to the remote support server request.

12. The computer-implemented method of claim 9, further comprising:

subsequent to sending the response packet to the second computing device that includes the input data, receiving, by one or more processors, confirmation from the second computing device that the update is scheduled for the scheduled time for the update.

13. The computer-implemented method of claim 9, wherein the status messages are received according to a predetermined time interval throughout the update.

14. The computer-implemented method of claim 9, wherein the set of data received from the second computing device is associated with a pre-scheduled periodic connection unrelated to the update.

15. The computer-implemented method of claim 9, wherein the status messages include information selected from the group consisting of: a reboot by the target system and an error.

16. The computer-implemented method of claim 9, wherein the authorization data comprises an authorization token generated by the second computing device.

17. A computer program product comprising:

one or more computer readable storage media, and program instructions collectively stored on the one or more computer readable storage media, the program instructions comprising:

program instructions to receive input data comprising: (i) a code level for an update, (ii) a target system for the update, (iii) a scheduled time for the update of the target system, and (iv) authorization data, wherein:

the target system does not allow external services to initiate calls into the target system; and the authorization data: (i) allows for scheduling of the update to the target system and (ii) is provided via a channel external from a connection to the target system;

program instructions to receive a set of data from the target system;

program instructions to, responsive to receiving the set of data from the target system, send a response packet to the target system that includes the input data;

program instructions to receive, at the scheduled time for the update of the target system, a request to process the update;

program instructions to, responsive to the request, send code for processing the update corresponding to the code level for the update; and program instructions to receive status messages corresponding to progress of the update.

18. The computer program product of claim 17, wherein the request to process the update comprises a remote support server request generated by the target system.

19. The computer program product of claim 18, wherein the status messages are appended to the remote support server request.

20. The computer program product of claim 17, further comprising:

program instructions, collectively stored on the one or more computer readable storage media, to, subsequent to sending the response packet to the target system that includes the input data, receive confirmation from the target system that the update is scheduled for the scheduled time for the update.

21. The computer program product of claim 17, wherein the status messages are received according to a predetermined time interval throughout the update.

22. The computer program product of claim 17, wherein the set of data received from the target system is associated with a pre-scheduled periodic connection unrelated to the update.

23. The computer program product of claim 17, wherein the status messages include information selected from the group consisting of: a reboot by the target system and an error.

24. A computer program product comprising:
one or more computer readable storage media, and program instructions collectively stored on the one or more computer readable storage media, the program instructions comprising:
program instructions to receive input data replicated from a first device, the input data comprising: (i) a code level for an update, (ii) a target system for the update, (iii) a scheduled time for the update of the target system, and (iv) authorization data, wherein:
the target system does not allow external services to initiate calls into the target system; and
the authorization data: (i) allows for scheduling of the update to the target system and (ii) is provided via a channel external from a connection to the target system;
program instructions to receive a set of data from a second computing device in communication with the target system;
program instructions to, responsive to receiving the set of data from the second computing device, send a response packet to the second computing device that includes the input data;
program instructions to receive, at the scheduled time for the update of the target system, a request to process the update from the second computing device;
program instructions to, responsive to the request, send code for processing the update corresponding to the code level for the update to the second computing device; and
program instructions to receive status messages from the second computing device corresponding to progress of the update to the target system.

25. A computer system comprising:
one or more computer processors, one or more computer readable storage media, and program instructions collectively stored on the one or more computer readable storage media for execution by at least one of the one or more computer processors, the program instructions comprising:
program instructions to receive input data comprising: (i) a code level for an update, (ii) a target system for the update, (iii) a scheduled time for the update of the target system, and (iv) authorization data, wherein:
the target system does not allow external services to initiate calls into the target system; and
the authorization data: (i) allows for scheduling of the update to the target system and (ii) is provided via a channel external from a connection to the target system;
program instructions to receive a set of data from the target system;
program instructions to, responsive to receiving the set of data from the target system, send a response packet to the target system that includes the input data;
program instructions to receive, at the scheduled time for the update of the target system, a request to process the update;
program instructions to, responsive to the request, send code for processing the update corresponding to the code level for the update; and
program instructions to receive status messages corresponding to progress of the update.

\* \* \* \* \*